(12) United States Patent
Kaplan et al.

(10) Patent No.: US 8,663,457 B2
(45) Date of Patent: Mar. 4, 2014

(54) METHODS AND COMPOUNDS FOR IMPROVING SULFIDE SCAVENGING ACTIVITY

(75) Inventors: Gregory Kaplan, Richboro, PA (US); Ping Lue, Trevose, PA (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 13/303,461

(22) Filed: Nov. 23, 2011

(65) Prior Publication Data

US 2013/0131387 A1    May 23, 2013

(51) Int. Cl.
*C10G 29/20* (2006.01)
*C02F 1/00* (2006.01)
*C07C 211/03* (2006.01)

(52) U.S. Cl.
USPC ............ 208/207; 208/236; 210/749; 564/505

(58) Field of Classification Search
USPC .................................. 208/207, 236
See application file for complete search history.

(56) References Cited

U.S. PATENT DOCUMENTS

| 3,642,630 | A | 2/1972 | Macphail et al. |
| 4,824,475 | A | 4/1989 | Markley et al. |
| 4,978,512 | A | 12/1990 | Dillon |
| 5,074,991 | A | 12/1991 | Weers |
| 5,347,004 | A | 9/1994 | Rivers et al. |
| 5,554,349 | A | 9/1996 | Rivers et al. |
| 6,242,598 | B1 | 6/2001 | Stevenson et al. |
| 6,710,213 | B2 | 3/2004 | Aoki et al. |
| 6,982,352 | B2 | 1/2006 | Lappe et al. |
| 7,140,433 | B2 | 11/2006 | Gatlin et al. |
| 7,268,134 | B2 | 9/2007 | Timmer et al. |
| 7,491,846 | B2 | 2/2009 | Aoki et al. |
| 7,517,447 | B2 | 4/2009 | Gatlin |
| 2010/0197968 | A1 | 8/2010 | Falana et al. |
| 2012/0012507 | A1* | 1/2012 | Compton et al. ............ 208/289 |

FOREIGN PATENT DOCUMENTS

| CA | 2005946 | 6/1990 |
| CA | 2239587 | 12/1998 |
| EP | 0882778 A2 | 12/1998 |
| GB | 2409859 B | 7/2005 |
| WO | 2012009396 A2 | 1/2012 |

OTHER PUBLICATIONS

Search Report and Written Opinion from corresponding PCT Application No. PCT/US2012/062033 dated Dec. 20, 2012.
Guoa et al., "A Convenient One-Pot Synthesis of Asymmetric 1, 3, 5-Triazine-2, 4, 6-Triones and Its Application Towards a Novel Class of Gonadotropin-Releasing Hormone Receptor Antagonists", Bioorganic & Medicinal Chemistry Letters, vol. 3, pp. 693-698, 2005.
Kickelbick et al., "Synthesis of Hexadentate Hexahydro-1, 3,5-Triazine-Based Ligands and their Copper (I) Complexes", Monatshefte fur Chemie / Chemical Monthy, vol. 133, pp. 1157-1164, 2002.
Zuivertz et al., "The Effect of Some Asymmetric Triazine Derivatives on the in Vitro Formation of Free Superoxide Radicals", Virologie, vol. 37, pp. 131-135, 1986.
Bernard et al., "Characterization by Electron Paramagnetic Resonance Spectroscopy of the Coordination Environment of Copper in Some Copper (II) Complexes of Asymmetric Triazines Having High Superoxide Dimutase Activity", Polyhedron, vol. 14, pp. 2523=2535, 1995.

\* cited by examiner

*Primary Examiner* — Brian J Davis
(74) *Attorney, Agent, or Firm* — Wegman, Hessler & Vanderburg

(57) ABSTRACT

Methods for reducing sulfides from fluid streams are provided. The methods comprise adding secondary amine-formaldehyde adduct (SAFA) scavengers to fluid streams. The SAFA scavengers added comprise less than about 40 wt % N-methyl secondary amines of the total weight of SAFA scavengers. Methods for distilling N-methyl secondary amines from secondary amine-formaldehyde adduct (SAFA) scavengers are also provided. Purified SAFA scavengers are also disclosed.

25 Claims, No Drawings

METHODS AND COMPOUNDS FOR IMPROVING SULFIDE SCAVENGING ACTIVITY

FIELD OF INVENTION

The invention pertains to methods and chemical compositions for reacting with sulfides, and more particularly, for scavenging sulfides from water and hydrocarbon streams.

BACKGROUND OF THE INVENTION

Hydrogen sulfide, or $H_2S$, is a clear, toxic gas with a foul odor. It is also highly flammable. The Environmental Protection Agency and other regulatory agencies worldwide strictly control the release of $H_2S$ into the environment. $H_2S$ may be present in well water, waste water and other aqueous systems. $H_2S$ is often present in crude oil and natural gas reserves and must be reduced before making commercial use of such reserves. The $H_2S$ concentration in these reserves prior to treatment typically varies with location and is usually higher in natural gas than in crude oil reserves. In natural gas reserves, for example, $H_2S$ may vary from less than 100 ppm to 3000 ppm. Permitted $H_2S$ levels will also vary by location. The U.S. limits $H_2S$ in natural gas pipelines to 4 ppm per 100 standard cubic feet (0.3 gr/100 scf).

Generally, hydrocarbon streams are treated to reduce sulfides, including organic sulfides, mercaptans, thiols, COS, and $H_2S$, by using chemicals that will react with the sulfides. These chemicals are called scavengers, or sweetening agents. These chemical scavengers include adducts produced through the reaction of secondary amines and formaldehyde. These secondary-amine formaldehyde adduct (SAFA) scavengers include triazines, oxazolidines, Schiff bases, diamines, methyol adducts, and methylene bridge materials.

Most hydrocarbon reserves are treated continuously near the wellhead, though treating hydrocarbons in a batch or similar application elsewhere is not uncommon. Continuous treatment installations near the wellhead inject scavengers, including SAFA scavengers, directly into the hydrocarbon pipeline. The injection system typically includes a chemical injection pump and piping tees or atomization nozzles to introduce the scavengers into the pipeline. The amount of scavengers required will vary depending on a variety of factors including, the type of scavengers used, the amount of $H_2S$ in the well, permissible $H_2S$ limits, and the well flow rate. Thus, the amount of scavengers added to treat a hydrocarbon pipeline typically ranges from approximately 10 ppm to about 100,000 ppm by volume of the hydrocarbon stream. A length of the pipeline is provided to allow for contact between the scavenger and the sulfide.

BRIEF DESCRIPTION OF THE INVENTION

It was surprisingly discovered that some secondary amine-formaldehyde adducts, N-methyl secondary amines, are inert with $H_2S$. These deleterious N-methyl secondary amines have a methyl group and lack an ether or polyether group, making them inert with respect to $H_2S$. N-methyl secondary amines are often present in SAFA scavengers. N-methyl secondary amines may have the structure as set forth in formula I or II:

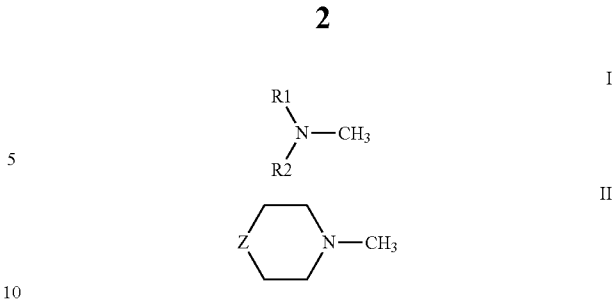

where $R_1$, and $R_2$ may be the same or different alkyls, hydroxyl-substituted alkyls, and alkoxy-substituted alkyls of 1 to 20 carbon atoms; the alkyl groups may be straight or branched alkyl groups, including, but not limited to, methyl, ethyl, propyl, butyl, hydroxylethyl, and methoxypropyl; and the cycloalkyl ring has an atom, Z, selected from the group consisting of carbon, oxygen, nitrogen, including NH (piperazine), piperidine, morpholine, and sulfur.

N-methyl secondary amines include cycloalkylmethylamines, dialkylmethylamines, and tertiary amines Examples of N-methyl secondary amines include, but are not limited to, diethylmethylamine, dipropylmethylamine, dibutylmethylamine, N-methyl piperazine, N-methyl piperidine, N-methyl morpholine, and N,N-dimethylmethanamine.

Accordingly, in one embodiment, a method for reducing sulfides from fluid streams is disclosed wherein the secondary amine-formaldehyde adduct (SAFA) scavengers used have reduced levels of N-methyl secondary amines. The method comprises providing a fluid stream and contacting the sulfides in the fluid stream with SAFA scavengers. The N-methyl secondary amines comprise less than about 40 wt % of the total weight of the SAFA scavengers. The sulfides reduced include organic sulfides, mercaptans, thiols, COS, and $H_2S$.

In another embodiment, the fluid stream is a hydrocarbon stream. In another embodiment, the fluid stream is an aqueous stream.

In another embodiment, the SAFA scavengers used to scavenge sulfides comprise less than about 20 wt % N-methyl secondary amines. In yet another embodiment, the SAFA scavengers comprise less than about 5 wt % N-methyl secondary amines. In another embodiment, the N-methyl secondary amines are dibutylmethylamine.

In other embodiments, a method for reducing sulfides from fluid streams is disclosed wherein the SAFA scavengers used comprise dibutylamine-formaldehyde adduct scavengers. These scavengers have the structure as set forth in formula III or IV:

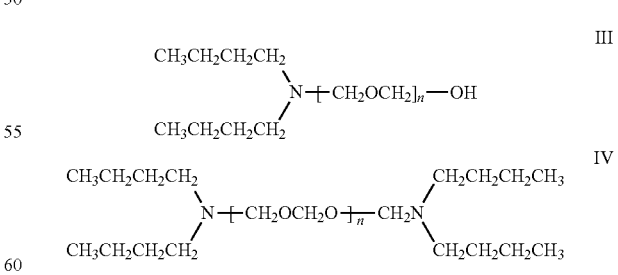

where n may be 1 to 100.

In another method, SAFA scavengers having less than 40 wt % N-methyl secondary amines are added to a fluid stream in an amount ranging from about 10 to about 100,000 ppm by volume of the fluid stream. In another method, SAFA scavengers are added to a fluid stream in an amount ranging from about 100 to about 50,000 ppm by volume of the fluid stream. In yet another method, SAFA scavengers are added to a fluid stream in an amount ranging from about 600 to about 3,000 ppm by volume of the fluid stream.

It was also surprisingly discovered that N-methyl secondary amines have a lower boiling point than secondary amine-formaldehyde adducts suitable for sulfide scavenging. The boiling point at 760 mmHg of many N-methyl secondary amines, including dibutylmethylamine, ranges from about 160 to about 170° C. Accordingly, another embodiment discloses a method for reducing N-methyl secondary amines from SAFA scavengers through distillation. A distillation apparatus is charged with SAFA scavengers. The SAFA scavengers are distilled producing a vapor stream comprising N-methyl secondary amines as distillate and a liquid stream as bottoms. The vapor stream is removed. The bottoms are retained as purified SAFA scavengers comprising less than 40 wt % N-methyl secondary amines of the total bottoms weight. In another embodiment, the pressure is maintained at from about 0.1 to about 760 mm Hg. In yet another embodiment, the temperature is maintained at from about 45 to about 170° C.

In another embodiment, a method is disclosed wherein the purified SAFA scavengers comprise less than about 20 wt % N-methyl secondary amines. In yet another method, the purified SAFA scavengers produced comprise less than about 5% N-methyl secondary amines. In yet other embodiments, the SAFA scavengers distilled comprise dibutylamine-formaldehyde adduct scavengers and the N-methyl secondary amines reduced comprise dibutylmethylamine.

In another embodiment, purified secondary amine-formaldehyde adduct (SAFA) scavengers are disclosed comprising less than about 40 wt % N-methyl secondary amines or dibutylmethylamine. In another embodiment the purified SAFA scavengers comprise less than about 20 wt % N-methyl secondary amines or dibutylmethylamine. In yet another embodiment, the purified SAFA scavengers comprise less than about 5 wt % N-methyl secondary amines or dibutylmethylamine.

In another embodiment, the purified SAFA scavengers comprise dibutylamine-formaldehyde adduct scavengers having the structure as set forth in formula III or IV:

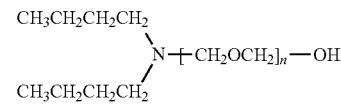

III

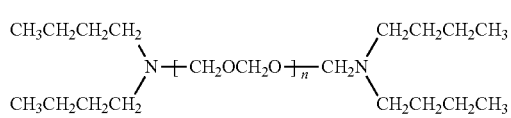

IV where n may be 1 to 100.

DETAILED DESCRIPTION OF EXEMPLARY EMBODIMENTS

Secondary amine-formaldehyde adducts suitable for sulfide scavenging include triazines, oxazolidines, Schiff bases, diamines, methyol adducts, and methylene bridge materials. Typically these scavengers are made by reacting a secondary amine with formaldehyde or paraformaldehyde. Suitable secondary amines for making $H_2S$ scavengers include, but are not limited to, dialkylamines, dimethylamine, diethylamine, dipropylamine, dipentylamine, diethanolamine, morpholine, piperazine, and piperidine. These secondary amines have the structure as set forth in formula V or VI:

V

VI where $R_1$, and $R_2$ may be the same or different alkyls, hydroxyl-substituted alkyls, and alkoxy-substituted alkyls of 1 to 20 carbon atoms; the alkyl groups may be straight or branched alkyl groups, including, but not limited to, methyl, ethyl, propyl, butyl, hydroxylethyl, and methoxypropyl; and the cycloalkyl ring has an atom, Z, selected from the group consisting of carbon, oxygen, nitrogen, including NH (piperazine), piperidine, morpholine, and sulfur.

When reacted with formaldehyde, the above secondary amines form secondary amine-formaldehyde adduct (SAFA) scavengers having the structure as set forth in formula VII, VIII, or IX:

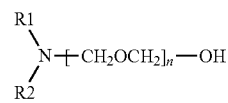

VII

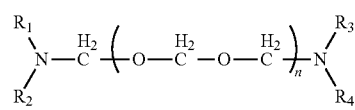

VIII

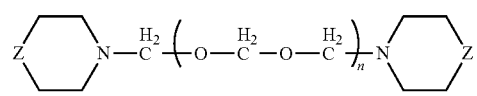

IX where n may be 1 to 100; where $R_1$, $R_2$, $R_3$, and $R_4$ may be the same or different alkyls, hydroxyl-substituted alkyls, and alkoxy-substituted alkyls of 1 to 20 carbon atoms; the alkyl groups may be straight or branched alkyl groups, including, but not limited to, methyl, ethyl, propyl, butyl, hydroxylethyl, and methoxypropyl; and the cycloalkyl ring has an atom, Z, selected from the group consisting of carbon, oxygen, nitrogen, including NH (piperazine), piperidine, morpholine, and sulfur. Alternative ranges for n include 1 to 20; 1 to 10; or 1 to 4.

It was surprisingly discovered that some secondary amine-formaldehyde adducts, N-methyl secondary amines, are inert with $H_2S$. These deleterious N-methyl secondary amines have a methyl group and lack an ether or polyether group, making them inert with respect to $H_2S$. N-methyl secondary amines are often present in SAFA scavengers. N-methyl secondary amines may have the structure as set forth in formula I or II:

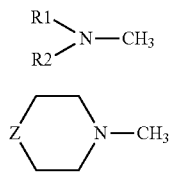

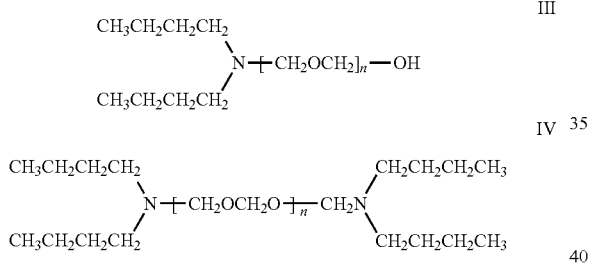

where $R_1$, and $R_2$ may be the same or different alkyls, hydroxyl-substituted alkyls, and alkoxy-substituted alkyls of 1 to 20 carbon atoms; the alkyl groups may be straight or branched alkyl groups, including, but not limited to, methyl, ethyl, propyl, butyl, hydroxylethyl, and methoxypropyl; and the cycloalkyl ring has an atom, Z, selected from the group consisting of carbon, oxygen, nitrogen, including NH (piperazine), piperidine, morpholine, and sulfur.

N-methyl secondary amines include cycloalkylmethylamines, dialkylmethylamines, and tertiary amines Examples of N-methyl secondary amines include, but are not limited to, diethyl methylamine, dipropylmethylamine, dibutylmethylamine, N-methyl piperazine, N-methyl piperidine, N-methyl morpholine, and N,N-dimethylmethanamine.

Other effective SAFA scavengers are products of di-n-butylamine and formaldehyde. The most effective scavenging adducts of di-n-butylamine and formaldehyde have the structure as set forth in III or IV:

$$CH_3CH_2CH_2CH_2 \diagdown N{-}[CH_2OCH_2]_n{-}OH \atop CH_3CH_2CH_2CH_2 \diagup \qquad \text{III}$$

$$CH_3CH_2CH_2CH_2 \diagdown \phantom{N{-}[CH_2OCH_2O]_n{-}CH_2N} \diagup CH_2CH_2CH_2CH_3 \atop \phantom{CH_3CH_2CH_2CH_2}N{-}[CH_2OCH_2O]_{\overline{n}}{-}CH_2N \atop CH_3CH_2CH_2CH_2 \diagup \phantom{N{-}[CH_2OCH_2O]_n{-}CH_2N} \diagdown CH_2CH_2CH_2CH_3 \qquad \text{IV}$$

where n may be 1 to 100. Alternative ranges for n include 1 to 20; 1 to 10; or 1 to 4.

The undesired byproduct of the di-n-butylamine and formaldehyde reaction is dibutylmethylamine (DBMA). This byproduct is also known methyl-dibutylamine, N-methyl-di-n-butylamine, or N-butyl-N-methylbutan-1-amine. As with other types of deleterious N-methyl secondary amines, DBMA has a methyl group and lacks an ether or polyether group, making it inert with respect to $H_2S$. DBMA has the structure and formula X:

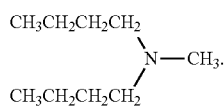

DBMA is not only inert with respect to $H_2S$; it is flammable. In addition, DBMA is soluble in hydrocarbon and thus can negatively affect downstream hydrocarbon applications. Negative effects include increasing the nitrogen content as well as increasing the likelihood of corrosion and fouling of processing equipment. Concentrations of DBMA in many $H_2S$ scavengers, however, may be as high as 55 wt % of the total weight of the $H_2S$ scavengers. High DBMA concentrations in these scavengers not only have the negative impacts mentioned above but also increase the volume of scavengers required, increasing treatment costs. It also lowers the scavenger flash point, resulting in increased storage and shipping costs. Thus, di-n-butylamine-formaldehyde adducts with low DBMA concentrations are preferred in $H_2S$ scavenging applications.

Accordingly, the first embodiment discloses a method for reducing sulfides from fluid streams. The secondary amine-formaldehyde adduct (SAFA) scavengers used have reduced levels of N-methyl secondary amines. The method comprises providing a fluid stream and contacting the sulfides in the fluid stream with SAFA scavengers. The N-methyl secondary amines comprise less than about 40 wt % of the total weight of the SAFA scavengers. Suitable SAFA scavengers include but are not limited to, triazines, oxazolidines, Schiff bases, diamines, methyol adducts, and methylene bridge materials. The sulfides reduced include organic sulfides, mercaptans, thiols, COS, and $H_2S$.

In another embodiment, the fluid stream is a hydrocarbon stream. In another embodiment, the fluid stream is an aqueous stream.

In another embodiment, the SAFA scavengers used to scavenge sulfides comprise less than about 20 wt % N-methyl secondary amines. In yet another embodiment, the SAFA scavengers comprise less than about 5 wt % N-methyl secondary amines. In another embodiment, the N-methyl secondary amines are dibutylmethylamine.

In other embodiments, a method for reducing sulfides from fluid streams is disclosed wherein the SAFA scavengers used comprise dibutylamine-formaldehyde adduct scavengers. These scavengers have the structure as set forth in formula III or IV:

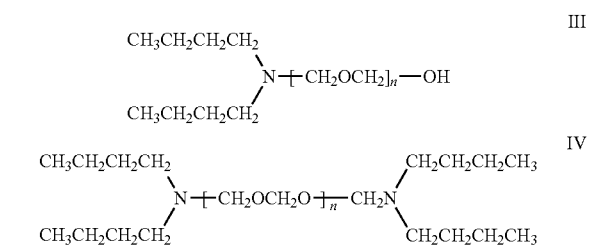

where n may be 1 to 100. Alternative ranges for n include 1 to 20; 1 to 10; or 1 to 4.

The amount of secondary amine-formaldehyde adducts added will depend on the application and amount of sulfide scavenging required. In another method, SAFA scavengers having less than 40 wt % N-methyl secondary amines are added to a fluid stream in an amount ranging from about 10 to about 100,000 ppm by volume of the fluid stream. In another method, SAFA scavengers are added to a fluid stream in an amount ranging from about 100 to about 50,000 ppm by volume of the fluid stream. In yet another method, SAFA scavengers are added to a fluid stream in an amount ranging from about 600 to about 3,000 ppm by volume of the fluid stream.

It was also surprisingly discovered that N-methyl secondary amines have a lower boiling point than secondary amine-formaldehyde adducts suitable for sulfide scavenging. The boiling point at 760 mmHg of many N-methyl secondary amines, including dibutylmethylamine, ranges from about 160 to about 170° C. Accordingly, another embodiment discloses a method for reducing N-methyl secondary amines from SAFA scavengers through distillation. SAFA scavengers used in this embodiment include, but are not limited to, triazines, oxazolidines, Schiff bases, diamines, methyol adducts, and methylene bridge materials. Any water present in SAFA scavengers may be separated using a water separator or membrane, or any other method known to those of ordinary skill in the art. The SAFA scavengers are then distilled using suitable distillation processes known to those of ordinary skill in the art, including but not limited to, continuous, single stage, fractional, batch distillation or vacuum distillation. A distillation apparatus is charged with SAFA scavengers. The SAFA scavengers are distilled producing a vapor stream comprising N-methyl secondary amines as distillate and a liquid stream as bottoms. The vapor stream is removed. The bottoms are retained as purified SAFA scavengers comprising less than about 40 wt % N-methyl secondary amines of the total bottoms weight.

In another embodiment, the SAFA scavengers are vacuum distilled. The pressure is maintained at from about 0.1 to about 760 mm Hg. In another embodiment, the temperature is maintained at from about 45 to about 170° C. In yet another embodiment, the pressure is maintained at from about 10 to about 15 mm Hg, and the temperature is maintained at from about 50 to about 80° C. Distillation stops after most of the N-methyl secondary amines are distilled off. The bottom fraction is retained and contains purified SAFA scavengers.

In another embodiment, a portion of the distillate is condensed and fed back into the distillation apparatus. Likewise, a portion of the bottoms may be fed back into the distillation apparatus.

In another embodiment, a method is disclosed wherein the purified SAFA scavengers comprise less than about 20 wt % N-methyl secondary amines. In yet another method, the purified SAFA scavengers produced comprise less than about 5% N-methyl secondary amines. In yet other embodiments, the SAFA scavengers distilled comprise dibutylamine-formaldehyde adduct scavengers and the N-methyl secondary amines reduced comprise dibutylmethylamine.

In another embodiment, purified secondary amine-formaldehyde adducts are disclosed comprising less than about 40 wt % N-methyl secondary amines or dibutylmethylamine. In another embodiment, the purified secondary amine-formaldehyde adducts comprise less than about 20 wt % N-methyl secondary amines or dibutylmethylamine. In yet another embodiment, the purified secondary amine-formaldehyde adducts comprise less than about 5 wt % N-methyl secondary amines or dibutylmethylamine.

In another embodiment, the purified SAFA scavengers comprise dibutylamine-formaldehyde adduct scavengers having the structure as set forth in formula III or IV:

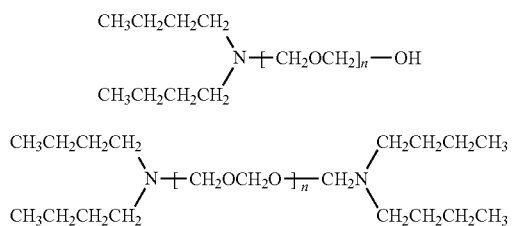

where n may be 1 to 100. Alternative ranges for n include 1 to 20; 1 to 10; or 1 to 4.

In other aspects, the fluid stream treated can comprise a fluid hydrocarbon stream or an aqueous fluid stream. These fluid streams may, for example, comprise gas/liquid mixtures from oilfield processes, pipelines, tanks, tankers, refineries, and chemical plants. Additionally the fluid stream may comprise farm discharge, city water, etc. Other additional fluid streams include water, waste water and process water containing $H_2S$.

EXAMPLES

Comparative Example 1

A flask equipped with a stirrer, condenser, and temperature control device was charged with 1 Mole (31.25 gm) of 96% pure paraformaldehyde and 0.5 Mole (65.0 gm) of di-n-butylamine. Contents of the flask were stirred for 2 hours at 80° C., and for 2 hours at 90° C. The top organic layer was separated and washed with water; yielding 75 gm of a clear, colorless liquid as secondary amine-formaldehyde adducts (Product I). Product I was analyzed by GC, showing presence of 41 wt % of dibutylmethylamine (DBMA) therein. The flash point of Product I was measured using the closed cup method and applicable standards known to those of ordinary skill in the art. The flashpoint was measured at 51.5° C. (124° F.).

Comparative Example 2

In this example, 200 ml of a light hydrocarbon mixture having 2,000 ppm of $H_2S$ level in the head space was placed in a 1-liter bottle. Next, Product I produced in Comparative Example 1 was added to the 1-liter bottle at 2,800 ppm by volume of the hydrocarbon mixture. After stirring for 30 minutes at room temperature, the $H_2S$ level in the head space was reduced to <0.5 ppm.

Comparative Example 3

In this example, 200 ml of a light hydrocarbon mixture having 2,000 ppm of $H_2S$ level in the head space was placed in a 1-liter bottle. Next, dibutylmethylamine (DBMA) commercially available from Aldrich was added to the 1-liter bottle at 10,000 ppm by volume of the hydrocarbon mixture. After stirring for 30 minutes at room temperature, the $H_2S$ level in the head space remained at 2,000 ppm.

Example 1

In this example, 50 gm of the Product I produced in Comparative Example 1 was subjected to careful overhead distillation under reduced pressure. The vacuum in the distillation apparatus was maintained at from about 10 to about 15 mm Hg. The temperature was maintained at from about 50° C. to about 80° C. A top fraction of 20 gm (Product II) and 30 gm of remaining bottom fraction (Product III) were retained. Product II was analyzed by GC and identified as pure DBMA. The flash point of the bottom fraction (Product III) was measured using the closed cup method and applicable standards known to those of ordinary skill in the art. The flash point was measured at 88.5° C. (191° F.).

Example 2

In this example, 200 ml of a light hydrocarbon mixture having 2,000 ppm of $H_2S$ level in the head space was placed in a 1-liter bottle. Next, the overhead distillate (Product II) produced in Example 1 was added to the 1-liter bottle at 10,000 ppm by volume of the hydrocarbon mixture. After stirring for 30 minutes at room temperature, the H₂S level in the head space remained at 2,000 ppm.

Example 3

In this example, 200 ml of a light hydrocarbon mixture having 2,000 ppm of H₂S level in the head space was placed in a 1-liter bottle. Next, the bottom fraction (Product III) produced in Example 1 was added to the 1-liter bottle at 1,800 ppm by volume of the hydrocarbon mixture. After stirring for 30 minutes at room temperature, the H₂S level in the head space was reduced to <0.5 ppm. This demonstrates a 36% improvement in H₂S scavenging efficiency compared to Product I produced in Comparative Example 1. The improvement resulted from reducing the amount of the inert and flammable impurity dibutylmethylamine (DBMA).

This written description uses examples to disclose the invention, including the best mode, and also to enable any person skilled in the art to practice the invention, including making and using any devices or systems and performing any incorporated processes. These examples are merely illustrative and do not limit the invention in any manner. For example, although the distillation conditions in the illustrative examples list specific temperatures and pressures, distillation can occur under a variety of conditions. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. A method for reducing sulfides from a fluid stream comprising
    contacting said sulfides in said fluid stream with at least one secondary amine-formaldehyde adduct (SAFA) scavenger wherein said SAFA scavenger comprises an N-methyl secondary amine, wherein the N-methyl secondary amine is a non-ether tertiary monoamine including a nitrogen bonded to a methyl, and wherein the SAFA scavenger comprises less than about 40 wt % of the N-methyl secondary amines.

2. The method of claim 1, wherein said sulfides comprise one or more members selected from the group consisting of organic sulfides, mercaptans, thiols, COS, and H₂S.

3. The method of claim 2, wherein said sulfides are H₂S.

4. The method of claim 1, wherein said fluid stream is a hydrocarbon stream.

5. The method of claim 1, wherein said fluid stream is an aqueous stream.

6. The method of claim 1, wherein said secondary-amine-formaldehyde adduct (SAFA) scavenger comprises less than about 20 wt % of the N-methyl secondary amine therein.

7. The method of claim 1, wherein said secondary amine-formaldehyde adduct (SAFA) scavenger comprises less than about 5 wt % of the N-methyl secondary amine therein.

8. The method of claim 1, wherein said secondary amine-formaldehyde adduct (SAFA) scavenger comprises a dibutylamine-formaldehyde adduct scavenger having the formula:

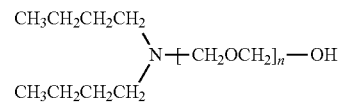

where n may be 1 to 100.

9. The method of claim 1, wherein said secondary amine-formaldehyde adduct (SAFA) scavenger comprises a dibutylamine-formaldehyde adduct scavenger having the formula:

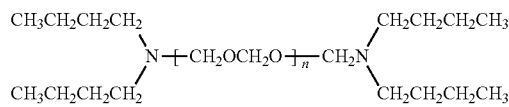

where n may be 1 to 100.

10. The method of claim 1, wherein said N-methyl secondary amine comprise dibutylmethylamine.

11. The method of claim 1, wherein said secondary amine-formaldehyde adduct (SAFA) scavenger is added to said fluid stream in an amount ranging from about 10 to about 100,000 ppm by volume of said fluid stream.

12. The method of claim 1, wherein said secondary amine-formaldehyde adduct (SAFA) scavenger is added to said fluid stream in an amount ranging from about 100 to about 50,000 ppm by volume of said fluid stream.

13. The method of claim 1, wherein said secondary amine-formaldehyde adduct (SAFA) scavenger is added to said fluid stream in an amount ranging from about 600 to about 3,000 ppm by volume of said fluid stream.

14. A method for reducing N-methyl secondary amines from secondary amine-formaldehyde adduct (SAFA) scavengers through distillation comprising:
    (c) feeding said SAFA scavengers to a distillation apparatus;
    (d) producing a vapor stream comprising said N-methyl secondary amines as distillate;
    (e) producing a liquid stream as bottoms;
    (f) removing said vapor stream; and
    (g) retaining said bottoms as purified SAFA scavengers comprising less than about 40 wt % N-methyl secondary amines therein.

15. The method of claim 14, wherein a pressure in said apparatus is maintained at from about 0.1 to about 760 mm Hg.

16. The method of claim 14, wherein a temperature in said apparatus is maintained at from about 45 to about 170° C.

17. The method of claim 14, wherein said purified SAFA scavengers comprise less than about 20 wt % N-methyl secondary amines therein.

18. The method of claim 14, wherein said purified SAFA scavengers comprise less than about 5 wt % N-methyl secondary amines therein.

19. The method of claim 14, wherein said SAFA scavengers comprise dibutylamine-formaldehyde adduct scavengers.

20. The method of claim 14, wherein said N-methyl secondary amines comprise dibutylmethylamine.

21. Purified secondary amine-formaldehyde adduct (SAFA) scavengers comprising an N-methyl secondary amine, wherein the N-methyl secondary amine is a non-ether tertiary monoamine including a nitrogen bonded to a methyl, and wherein the SAFA scavenger comprises less than about 40 wt % of the N-methyl secondary amine.

22. The purified SAFA scavengers of claim 21, wherein said purified SAFA scavengers comprise a dibutylamine-formaldehyde adduct scavenger having the formula:

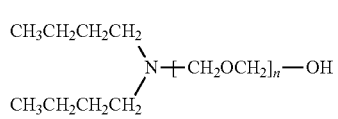

where n may be 1 to 100.

23. The purified SAFA scavengers of claim 21, wherein said purified SAFA scavengers comprise a dibutylamine-formaldehyde adduct scavenger having the formula:

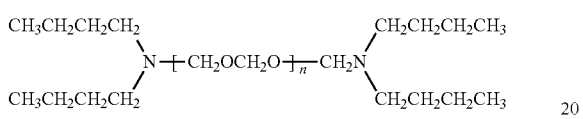

where n may be 1 to 100.

24. The purified SAFA scavengers of claim 21, wherein said purified SAFA scavengers comprise less than about 20 wt % of the N-Methyl secondary amine therein.

25. The purified SAFA scavengers of claim 21, wherein said purified SAFA scavengers comprise less than about 5 wt % of the N-methyl secondary amine therein.

* * * * *